(12) United States Patent
Chang et al.

(10) Patent No.: US 10,967,619 B2
(45) Date of Patent: Apr. 6, 2021

(54) POLYOLEFIN-BASED ELASTIC FILM STRUCTURES, LAMINATES AND METHODS THEREOF

(71) Applicant: Dow Global Technologies LLC, Midland, MI (US)

(72) Inventors: Andy C. Chang, Houston, TX (US); Jacquelyn A. Degroot, Sugar Land, TX (US); Kate R. Brown, Houston, TX (US); Aleksandar Stoiljkovic, Waedenswil (CH); Gert J. Claasen, Richterswil (CH); Barbara Bonavoglia, Zurich (CH); Carlos E. Ruiz, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 205 days.

(21) Appl. No.: 15/509,224

(22) PCT Filed: Sep. 21, 2015

(86) PCT No.: PCT/US2015/051135
§ 371 (c)(1),
(2) Date: Mar. 7, 2017

(87) PCT Pub. No.: WO2016/048857
PCT Pub. Date: Mar. 31, 2016

(65) Prior Publication Data
US 2017/0253012 A1    Sep. 7, 2017

Related U.S. Application Data

(60) Provisional application No. 62/055,023, filed on Sep. 25, 2014.

(51) Int. Cl.
B32B 27/32     (2006.01)
B29C 48/08     (2019.01)
(Continued)

(52) U.S. Cl.
CPC .......... B32B 27/32 (2013.01); B29C 48/0018 (2019.02); B29C 48/022 (2019.02);
(Continued)

(58) Field of Classification Search
CPC ........... B32B 27/32; B32B 7/02; B32B 27/08; B32B 27/12; B32B 37/182;
(Continued)

(56) References Cited

U.S. PATENT DOCUMENTS 4,041,203 A    8/1977    Brock et al.
4,107,364 A    8/1978    Sisson
(Continued)

FOREIGN PATENT DOCUMENTS

EP    0575509 A1    12/1993
EP    1729709 A1    12/2006
(Continued)

OTHER PUBLICATIONS

Wang, et al, "Comparison of Block and Random Ethylene-Octene Copolymers Based on the Structure and Elastomeric Properties" (ANTEC).
(Continued)

*Primary Examiner* — Scott R. Walshon
*Assistant Examiner* — Jasper Saberi (57) ABSTRACT

A stretch-modified elastomeric multilayer film comprising a core layer comprising a first ethylene-α-olefin block copolymer, wherein the first ethylene-α-olefin block copolymer comprises at least 50 mol. % ethylene, has a melt index (I2) from 0.5 g/10 min to 5 g/10 min, and has a density of 0.850 g/cc to 0.890 g/cc, and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index (I2) from 0.5 g/10
(Continued)

min to 25 g/10 min, and has a density of 0.850 g/cc to 0.890 g/cc, wherein the density of the first ethylene-α-olefin block copolymer is equal to or greater than the density of the second ethylene-α-olefin block copolymer.

16 Claims, 2 Drawing Sheets

(51) Int. Cl.
| | |
|---|---|
| B29C 48/00 | (2019.01) |
| B29C 48/21 | (2019.01) |
| B32B 27/08 | (2006.01) |
| B32B 5/02 | (2006.01) |
| B32B 27/12 | (2006.01) |
| B29C 55/00 | (2006.01) |
| B29C 55/04 | (2006.01) |
| B32B 7/02 | (2019.01) |
| B32B 37/18 | (2006.01) |
| B32B 38/00 | (2006.01) |
| B29K 23/00 | (2006.01) |
| B29L 7/00 | (2006.01) |
| B29L 9/00 | (2006.01) |

(52) U.S. Cl.
CPC .............. *B29C 48/08* (2019.02); *B29C 48/21* (2019.02); *B29C 55/005* (2013.01); *B29C 55/04* (2013.01); *B32B 5/022* (2013.01); *B32B 7/02* (2013.01); *B32B 27/08* (2013.01); *B32B 27/12* (2013.01); *B32B 27/327* (2013.01); *B32B 37/182* (2013.01); *B32B 38/0012* (2013.01); *B29K 2023/08* (2013.01); *B29K 2995/0063* (2013.01); *B29L 2007/008* (2013.01); *B29L 2009/00* (2013.01); *B32B 2038/0028* (2013.01); *B32B 2250/242* (2013.01); *B32B 2255/00* (2013.01); *B32B 2274/00* (2013.01); *B32B 2307/51* (2013.01); *B32B 2307/514* (2013.01); *B32B 2307/72* (2013.01); *B32B 2307/722* (2013.01); *B32B 2555/00* (2013.01)

(58) Field of Classification Search
CPC ............ B32B 38/0012; B32B 2307/72; B32B 2307/722; B32B 2555/02
See application file for complete search history.

(56) References Cited

U.S. PATENT DOCUMENTS

| | | | |
|---|---|---|---|
| 4,116,892 A | 9/1978 | Schwarz | |
| 4,153,751 A | 5/1979 | Schwarz | |
| 4,209,463 A | 6/1980 | Maender et al. | |
| 4,368,565 A | 1/1983 | Schwarz | |
| 4,515,595 A | 5/1985 | Kievit et al. | |
| 4,525,407 A | 6/1985 | Ness | |
| 4,720,415 A | 1/1988 | Vander Wielen et al. | |
| 5,143,679 A | 9/1992 | Weber et al. | |
| 5,145,727 A | 9/1992 | Potts et al. | |
| 5,151,092 A | 9/1992 | Buell et al. | |
| 5,156,793 A | 10/1992 | Buell et al. | |
| 5,167,897 A | 12/1992 | Weber et al. | |
| 5,169,706 A | 12/1992 | Collier, IV et al. | |
| 5,178,931 A | 1/1993 | Perkins et al. | |
| 5,188,885 A | 2/1993 | Timmons et al. | |
| 5,330,458 A | 7/1994 | Buell et al. | |
| 6,489,016 B2 | 12/2002 | Kishine | |
| 7,498,282 B2 | 3/2009 | Patel et al. | |
| 7,608,668 B2 | 10/2009 | Li Pi Shan et al. | |
| 7,741,397 B2 | 6/2010 | Liang et al. | |
| 7,807,593 B2 | 10/2010 | Patel et al. | |
| 7,858,706 B2 | 12/2010 | Arriola et al. | |
| 7,893,166 B2 | 2/2011 | Shan et al. | |
| 7,947,793 B2 | 5/2011 | Marchand et al. | |
| 8,337,190 B2 | 12/2012 | Curro et al. | |
| 8,721,827 B2 | 5/2014 | Chang et al. | |
| 2001/0014384 A1* | 8/2001 | Kishine | B32B 27/08 428/213 |
| 2003/0088228 A1 | 5/2003 | Desai et al. | |
| 2004/0222553 A1 | 11/2004 | Desai et al. | |
| 2005/0215964 A1 | 9/2005 | Autran et al. | |
| 2006/0003656 A1 | 1/2006 | Morman | |
| 2006/0199930 A1* | 9/2006 | Li Pi Shan | C08F 212/08 526/346 |
| 2006/0244184 A1 | 11/2006 | Ashraf et al. | |
| 2007/0078222 A1* | 4/2007 | Chang | B32B 27/32 525/88 |
| 2007/0092704 A1* | 4/2007 | Patel | D01F 6/46 428/212 |
| 2007/0167929 A1 | 7/2007 | Fossum et al. | |
| 2010/0209640 A1* | 8/2010 | Yun | B32B 27/08 428/35.7 |
| 2011/0123802 A1 | 5/2011 | Chang et al. | |
| 2011/0177735 A1 | 7/2011 | Tasi et al. | |
| 2012/0123371 A1 | 5/2012 | Melik et al. | |
| 2012/0271265 A1 | 10/2012 | Langdon | |

FOREIGN PATENT DOCUMENTS

| | | |
|---|---|---|
| WO | 97/36566 A1 | 10/1997 |
| WO | 00/45763 A1 | 8/2000 |
| WO | 2004/020174 A1 | 3/2004 |
| WO | 2009/094506 A1 | 7/2009 |

OTHER PUBLICATIONS

PCT/US15/051135, International Search Report and Written Opinion dated Feb. 11, 2015.
PCT/US15/051135, International Preliminary Report on Patentability dated Mar. 28, 2017.
Potemkin, "Microphase separation in correlated random copolymers: Mean-field theory and fluctuation corrections", Physical Review E, 1998, 57 (6), pp. 6902-6912.
Dobrynin, "Phase coexistence in random copolymers" J., Chem. Phvs., 1997, 107 (21), pp. 9234-9238.
Zweifel Hans, et al., "Plastics Additives Handbook", Hanser Gardner Publications, 5th Edition, chapter 7, 2001, pp. 585-600.
Wang, H.P. et al., "Characterization of Some New Olefinic Block Copolymers" Macromolecules, 2007, 40, 2852-62.

* cited by examiner

POLYOLEFIN-BASED ELASTIC FILM STRUCTURES, LAMINATES AND METHODS THEREOF

TECHNICAL FIELD

Embodiments of the present disclosure generally relate to polyolefin-based elastic film structures, laminates, and methods of manufacture, and more specifically relate to polyolefin-based elastic film structures, laminates, and methods of manufacture such items for use in hygiene and medical products.

BACKGROUND

Extensible laminate materials that include films, such as, elastic films, are commonly used for a wide variety of applications. Disposable hygiene products, especially consumer-related products, often have one or more elastic elements that are integral to their use, function, or appeal. Highly elastic elements can be critical to the fit of certain consumer-related products, such as, diapers, training pants and adult incontinence products in the waist, ears, side-panels, and cuff regions. Elastic films, however, are not without their drawbacks. The films can be difficult to handle due to tackiness of the films on the roll, which can cause blocking, i.e., where the film sticks to itself, or causes machinability issues where the film sticks to equipment parts.

There have been various approaches taken to provide highly elastic elements. For example, elastic films or nonwoven webs have been formulated from elastic materials, such as, styrenic block copolymers (SBCs). SBCs can exhibit excellent physical properties, such as, elasticity and flexibility; however, elastic films or nonwoven webs made entirely of SBCs can be costly. Furthermore, certain styrenic block copolymers can have a limited process window as a result of poor thermal stability. For example, styrene-isoprene-styrene (SIS) and styrene-butadiene-styrene (SBS) can undergo thermal degradation and consequently suffer from decreased processability, machinability, and reduced mechanical performance. SBCs with hydrogenated midblocks such as styrene-ethylene/butylene-styrene (SEBS), styrene-ethylene/propylene-styrene (SEPS), and other SBCs can exhibit greater thermal stability but suffer due to greater energy intensity, higher $CO_2$ output, and other environmental and economic disadvantages in the course of their manufacture. Though thermally more stable and more environmentally and economically advantaged than some SBCs, polyolefin elastomers can exhibit lower than desired physical properties.

Other approaches for providing highly elastic elements involve laminating an elastomer film to a nonwoven substrate to form a laminate, and then stretching the laminate to activate the non-woven and impart the necessary elasticity. Still other approaches involve coextruding a low crystallinity elastic core material with less elastic, less tacky, or higher crystallinity materials in the skins to reduce blocking and improve the machinabilty and handling of the film. Such films can be stretched to impart the desired elasticity as disclosed in U.S. Pat. No. 7,498,282.

Accordingly, alternative approaches for polyolefin-based elastic film structures, laminates, and methods of manufacture of such items are disclosed herein.

SUMMARY

Disclosed in embodiments herein are stretch-modified elastomeric multilayer films. The films comprise a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc, and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc, wherein the density of the first ethylene-α-olefin block copolymer is equal to or greater than the density of the second ethylene-α-olefin block copolymer. Also disclosed in embodiments herein are laminates comprising stretch-modified elastomeric multilayer films as disclosed herein.

Further disclosed in embodiments herein are processes for manufacturing stretch-modified elastomeric multilayer films. The processes comprise providing a multilayer film comprising a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc, and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc, wherein the density of the first ethylene-α-olefin block copolymer is equal to or greater than the density of the second ethylene-α-olefin block copolymer, performing a first stretch of the film in at least one direction to a draw ratio of at least 1.9 to form a stretch-modified multilayer film, and substantially relaxing the stretch-modified multilayer film in the at least one direction.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to embodiments of stretch-modified elastomeric multilayer films, laminates, and methods thereof, examples of which are described and illustrated in the accompanying figures. The stretch-modified elastomeric multilayer films may be used to produce components for absorbent hygiene products (e.g., diaper products, training pants, and adult incontinence products), such as, for example, backsheets, waistbands, cuffs, side panels, and diaper ears. It is noted, however, that this is merely an illustrative implementation of the embodiments disclosed herein. The embodiments are applicable to other technologies that are susceptible to similar problems as those discussed above. For example, stretch-modified elastomeric multilayer films may be used to produce bags, disposable wear, cloth-like wipes, face masks, surgical gowns, tissues, bandages and wound dressings are clearly within the purview of the present embodiments.

As used herein, "stretch-modified" refers to films that undergo at least a first stretch in at least one direction after film formation and prior to subsequent processing steps, such as, lamination or bonding with a substrate or another film. In some embodiments, the films may undergo at least a first stretch in at least one direction to a draw ratio of at least 1.9 to form a stretch-modified film. In other embodiments, the films may undergo at least a first stretch in at least one direction to a draw ratio of at least 3.6 to form a stretch-modified film. In further embodiments, the films may undergo at least a first stretch in at least one direction to a draw ratio of at least 4.5 to form a stretch-modified film. In even further embodiments, films may undergo at least a first stretch in at least one direction to a draw ratio of at least 5.7 to form a stretch-modified film. In even further embodiments, films may undergo at least a first stretch in at least one direction to a draw ratio of at least 6.5 to form a stretch-modified film.

The draw ratio may be determined as described in U.S. Pat. No. 4,116,892 (the '892 patent), and is calculated by the following equation provided in FIG. 3 of '892 patent:

$$\text{Draw Ratio}\left(\frac{l}{w}\right) = \int_0^\pi \frac{1}{\pi}\sqrt{1 + a^2\cos^2 x}\,dx,$$

where l=length of the sinus wave (as shown in FIG. 3 of the '892 patent), a=πd/w, d=groove depth, and w=distance between discs (as shown in FIG. 3 of the '892 patent). The Actual Draw Rate (ADR) is calculated by the following equation:

$$ADR = \frac{(\text{Draw Ratio} - 1)V}{4\frac{d}{w}\sqrt{\frac{R}{D} - \frac{1}{4}}},$$

where d=groove depth, w=distance between discs (as shown in FIG. 3 of the '892 patent), l=length of the sinus wave (as shown in FIG. 3 of the '892 patent), V is the velocity of the film entering the nip of the rollers; and R is the radius of the rollers.

The stretch-modified elastomeric multilayer films comprise a core layer comprising a first ethylene-α-olefin block copolymer and at least one outer layer. The core layer may be positioned adjacent to the at least one outer layer or alternatively, there may be at least one intervening layer (e.g., inner layer) between the core layer and the at least one outer layer. In some embodiments, the films comprise a core layer and two outer layers, wherein the core layer is positioned between the two outer layers. In other embodiments, an inner layer may be positioned between the core layer and one or both of the two outer layers. In further embodiments, the films comprise a core layer positioned between two outer layers, and two or more inner layers positioned between the core layer and one or both of the two outer layers. Each inner layer may be the same or different than other inner layers present in the films. It should be understood that the stretch-modified elastomeric multilayer films may comprise other combinations of core, outer, and inner layers in accordance with the teachings herein.

In embodiments herein, the thickness ratio of the at least one outer layer to the core layer can be captured by percentages. For example, in some embodiments, the core layer comprises at least about 50%, 60%, 70%, 80%, 90%, or 95% of the overall film thickness. In other embodiments, the core layer comprises from about 50% to about 95% of the overall film thickness. In other embodiments, the core layer comprises from about 60% to about 90% of the overall film thickness. In further embodiments, the core layer comprises from about 70% to about 90% of the overall film thickness. In some embodiments, the at least one outer layer independently comprise from about 2% to about 30%, from about 5% to about 30%, or from about 5% to about 20% of the overall film thickness. In embodiments herein where two or more outer layers are present, each outer layer may have an equal thickness, or alternatively, may have an unequal thickness. In embodiments herein, an inner layer may be present. The inner layer may be positioned between the core layer and the at least one outer layer. In some embodiments, the inner layer may independently comprise from about 2% to about 20%, from about 2% to about 15%, or from about 2% to about 10% of the overall film thickness. In embodiments herein where two or more inner layers are present, each inner layer may have an equal thickness, or alternatively, may have an unequal thickness.

Core Layer

The core layer comprises a first ethylene-α-olefin block copolymer. The term "ethylene-α-olefin block copolymer" or "OBC" means an ethylene/α-olefin multi-block copolymer and includes ethylene and one or more copolymerizable α-olefin comonomer in polymerized form, and is characterized by multiple blocks or segments of two or more polymerized monomer units differing in chemical or physical properties. The terms "interpolymer" and "copolymer" are used interchangeably herein. When referring to amounts of "ethylene" or "comonomer" in the copolymer, it is understood that this means polymerized units thereof. Ethylene-α-olefin block copolymers used in embodiments described herein can be represented by the following formula:

(AB)$_n$ where: n is at least 1, and, in some embodiments, an integer greater than 1, such as 2, 3, 4, 5, 10, 15, 20, 30, 40, 50, 60, 70, 80, 90, 100, or higher; "A" represents a hard block or segment; and "B" represents a soft block or segment. In some embodiments, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the ethylene-α-olefin block copolymers described herein do not usually have a third type of block, which comprises a different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

In embodiments herein, ethylene may comprise the majority mole fraction of the whole ethylene-α-olefin block copolymers, i.e., ethylene comprises at least 50 mol. % of the whole polymer. In some embodiments, ethylene comprises at least 60 mol. %, at least 70 mol. %, or at least 80 mol. %. The substantial remainder of the whole polymer comprises at least one other comonomer that is an α-olefin having 3 or more carbon atoms. In some embodiments, the ethylene-α-olefin block copolymers described herein may comprise 50 mol. % to 90 mol. %, 60 mol. % to 85 mol. %, or 65 mol. % to 80 mol. % of ethylene. The comonomer content may be measured using any suitable technique, such as techniques based on nuclear magnetic resonance ("NMR") spectroscopy, and, for example, by $^{13}$C NMR analysis as described in U.S. Pat. No. 7,498,282, which is incorporated herein by reference.

The ethylene-α-olefin block copolymers described herein include various amounts of "hard" and "soft" segments. "Hard" segments are blocks of polymerized units in which ethylene is present in an amount greater than 95 wt. %, or greater than 98 wt. % based on the weight of the polymer, up to 100 wt. %. In other words, the comonomer content (content of monomers other than ethylene) in the hard segments is less than 5 wt. %, or less than 2 wt. % based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt. %, or greater than 8 wt. %, greater than 10 wt. %, or greater than 15 wt. % based on the weight of the polymer. In some embodiments, the comonomer content in the soft segments can be greater than 20 wt. %, greater than 25 wt. %, greater than 30 wt. %, greater than 35 wt. %, greater than 40 wt. %, greater than 45 wt. %, greater than 50 wt. %, or greater than 60 wt. % and can be up to 100 wt. %.

The soft segments can be present in the ethylene-α-olefin block copolymers described herein from 1 wt. % to 99 wt. % of the total weight of the ethylene-α-olefin block copolymer, or from 5 wt. % to 95 wt. %, from 10 wt. % to 90 wt. %, from 15 wt. % to 85 wt. %, from 20 wt. % to 80 wt. %, from 25 wt. % to 75 wt. %, from 30 wt. % to 70 wt. %, from 35 wt. % to 65 wt. %, from 40 wt. % to 60 wt. %, or from 45 wt. % to 55 wt. % of the total weight of the ethylene-α-olefin block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The ethylene-α-olefin block copolymers described herein comprise two or more chemically distinct regions or segments (referred to as "blocks") that can be joined in a linear manner, that is, a polymer comprising chemically differentiated units which are joined end-to-end with respect to polymerized ethylenic functionality, rather than in pendent or grafted fashion. In some embodiments, the blocks differ in the amount or type of incorporated comonomer, density, amount of crystallinity, crystallite size attributable to a polymer of such composition, type or degree of tacticity (isotactic or syndiotactic), regio regularity or regio-irregularity, amount of branching (including long chain branching or hyper branching), homogeneity or any other chemical or physical property. Compared to block interpolymers of the prior art, including interpolymers produced by sequential monomer addition, fluxional catalysts, or anionic polymerization techniques, the ethylene-α-olefin block copolymers may be characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In some embodiments, the ethylene-α-olefin block copolymers described herein are produced in a continuous process and possess a polydispersity index, PDI, from 1.7 to 3.5, from 1.8 to 3, from 1.8 to 2.5, or from 1.8 to 2.2. When produced in a batch or semi-batch process, the ethylene-α-olefin block copolymers described herein possess PDI from 1.0 to 3.5, from 1.3 to 3, from 1.4 to 2.5, or from 1.4 to 2. In addition, the ethylene-α-olefin block copolymers described herein possess a PDI fitting a Schultz-Flory distribution rather than a Poisson distribution. In embodiments herein, the ethylene-α-olefin block copolymers described herein may have both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, Physical Review E (1998) 57 (6), pp. 6902-6912, and Dobrynin, J. Chem. Phys. (1997) 107 (21), pp 9234-9238.

In some embodiments, the ethylene-α-olefin block copolymers described herein possess a most probable distribution of block lengths. In some embodiments, the ethylene-α-olefin block copolymers described herein are defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)2, \text{ and/or}$$

(B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \, \Delta H + 62.81 \text{ for } \Delta H \text{ greater than zero and up to 130 J/g, and}$$

$$\Delta T > 48° \text{ C. for } \Delta H \text{ greater than 130 J/g;}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the first ethylene-α-olefin block copolymer, and has a density, d, in grams/cubic centimeter, wherein the numerical values of Re and d satisfy the following relationship when first ethylene-α-olefin block copolymer is substantially free of cross-linked phase:

Re>1481−1629(d); and/or (D) has a molecular fraction which elutes between 40° C. and 130° C. when fractionated using TREF, characterized in that the fraction has a molar comonomer content greater than, or equal to, the quantity (−0.2013) T+20.07, or greater than or equal to the quantity (−0.2013) T+21.07, where T is the numerical value of the peak elution temperature of the TREF fraction, measured in ° C.; and/or, (E) has a storage modulus at 25° C., G' (25° C.), and a storage modulus at 100° C., G' (100° C.), wherein the ratio of G' (25° C.) to G' (100° C.) is in the range of 1:1 to 9:1.

The ethylene-α-olefin block copolymers described herein may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the ethylene-α-olefin block copolymers may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No 7,608,668, Col. 31, line 26 through Col. 35, line 44, which is herein incorporated by reference for that purpose.

Suitable monomers for use in preparing the ethylene-α-olefin block copolymers described herein include ethylene and one or more polymerizable straight-chain or branched α-olefins of 3 to 30, or 3 to 20, carbon atoms, such as, propylene, 1 butene, 1 pentene, 3-methyl-1-butene, 1-hexene, 4-methyl-1-pentene, 3-methyl-1-pentene, 1-octene, 1 decene, 1-dodecene, 1-tetradecene, 1-hexadecene, 1-octadecene and 1 eicosene. In some embodiments, the first ethylene-α-olefin block copolymer is an ethylene/octene block copolymer, wherein the ethylene content is greater than 80 mol. % of the whole polymer and the octene content is from 10 to 15 mol. %, or from 15 to 20 mol. % of the whole polymer.

The ethylene-α-olefin block copolymers described herein can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. 51, line 29 through Col. 54, line 56. The process is also described, for example, in U.S. Pat. Nos. 7,608,668; 7,893,166; and 7,947,793.

In embodiments herein, the first ethylene-α-olefin block copolymer has a density of from 0.850 g/cc to 0.890 g/cc, from 0.850 g/cc to 0.885 g/cc, from 0.855 g/cc to 0.880 g/cc, or from 0.860 g/cc to 0.879 g/cc. In embodiments herein, the first ethylene-α-olefin block copolymer has a melt index (MI) from 0.1 g/10 min to 10 g/10, 0.5 g/10 min to 5 g/10 min, 0.5 g/10 min to 3 g/10 min, 0.5 g/10 min to 2 g/10 min, 0.5 g/10 min to 1.5 g/10 min, 0.5 g/10 min to 1 g/10 min, or 0.5 g/10 min to less than 1 g/10 min, as measured by ASTM D 1238 (190° C./2.16 kg).

The first ethylene-α-olefin block copolymer may comprise at least 50 wt. % of the core layer. For example, in some embodiments, the first ethylene-α-olefin block copolymer may comprise at least 55 wt. % of the core layer, 60 wt. % of the core layer, 65 wt. % of the core layer, 70 wt. % of the core layer, 75 wt. % of the core layer, at least 85 wt. % of the core layer, at least 95 wt. % of the core layer, at least 99 wt. % of the core layer, or at least 100 wt. % of the core layer.

In embodiments herein, the first ethylene-α-olefin block copolymer may have a low to moderate level of crystallinity. The crystallinity of the first ethylene-α-olefin block copolymer may be expressed in terms of crystallinity percent. For example, in some embodiments, the first ethylene-α-olefin block copolymer has a crystallinity from a lower limit of 1%, 2% or 3% to an upper limit of 28%, 30%, or 35%. The crystallinity may also be described in terms of thermal energy. The thermal energy (or heat of fusion) for 100% crystalline polypropylene is taken to be 165 J/g, and for 100% crystalline polyethylene is 292 J/gm. In embodiments herein, the first ethylene-α-olefin block copolymer may have a heat of fusion, as determined by DSC, ranging from a lower limit of about 1 Joules/gram (J/g), or 3 J/g, or 5 J/g, or 7 J/g, to an upper limit of about 100 J/g, 95 J/g, 90 J/g, or 85 J/g.

The level of crystallinity may also be reflected in the melting point. "Melting point" is determined by DSC. The first ethylene-α-olefin block copolymer may have one or more melting points. The peak having the highest heat flow (i.e., tallest peak height) of these peaks is considered the melting point. The first ethylene-α-olefin block copolymer may have a melting point, as determined by DSC, ranging from 113° C. to 124° C. or 113° C. to 128° C.

In some embodiments, the core layer may also be a polymer blend comprising the first ethylene-α-olefin block copolymer with other core layer polymers suitable for melt processing in blown film, cast film, extrusion coating processes or enhancing or modifying elastic performance, which may include, for example, low density polyethylene suitable for improving processability, among other things, one or more additional ethylene-α-olefin block copolymers as described herein, ethylene or propylene random copolymers, such as, the AFFINITY™ and VERSIFY™ resins commercially available from The Dow Chemical Company, the EXACT™ or VISTAMAXX™ resins commercially available from Exxon Mobil Corporation, or suitable styrenic block copolymers, such as those marketed under the tradename KRATON™, and commercially available from Kraton Polymers, Inc. As used herein, "polymer blend" refers to a mixture of two or more polymers. The polymer blend may be immiscible, miscible, or compatible. While the first ethylene/α-olefin block copolymer can be blended with one or more core layer polymers, the as-produced first ethylene/α-olefin block copolymer is substantially pure and often comprises a major component of the reaction product of a polymerization process. In embodiments where the core layer comprises a polymer blend of a first ethylene-α-olefin block copolymer and one or more additional core layer polymers, the one or more additional core layer polymers may comprise less than 30 wt. %, less than 25 wt. %, less than 20 wt. %, less than 15 wt. %, less than 10 wt. %, or less than 5 wt. % of the core layer.

The core layer may optionally comprise one or more slip agents. As used herein "slip agent" or "slip additive" means an external lubricant. Examples of suitable slip agents may include, but are not limited to, amide slip agents, such as, for example, saturated fatty acid amides or ethylenebis(amides), an unsaturated fatty acid amides, or ethylenebis(amides) or combinations thereof. In some embodiments, the slip agent may include oleamide, erucamide, linoleamide, erucamidoethylerucamide. oleamidoethyloleamide, erucamidoethyloleamide, oleamidoethylerucamide. stearamidoethylerucamide erucamidoethylpalmitamide. palmitamidoethyloleamide, palmitamide, stearamide, arachidamide, behenamide, stearyl stearamide, palmityl pamitamide. stearyl arachidamide, stearamidoethylstearamide, stearamidoethylpalmitamide, palmitamido-ethylstearamide, or combinations thereof. Such slip agents are also disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In some embodiments, the film further comprises a slip agent in the core layer.

The total amount of the one or more slip agents present in the core layer may range from 0-1 wt. %. All individual values and subranges are included and disclosed herein. For example, in some embodiments, the total amount of the one or more slip agents present in the core layer is from 0-0.5 wt. %. In other embodiments, the total amount of the one or more slip agents present in the core layer is from 0.05-0.3 wt. %. Slip additives may be added to a carrier resin in the form of a pre-compound masterbatch. The carrier resin may be an ethylene-α-olefin block copolymer as previously described herein. Suitable methods for incorporating slip agents into a carrier resin are known to those of ordinary skill in the art and can include, for example, melt blending or solution blending, which may be performed using, for example, an extruder (single-screw, twin-screw) or static mixer. In some embodiments, a slip agent masterbatch containing the desired amount of slip agent is incorporated during the film preparation step by dry blending with other polymer resins. For example, in a melt extrusion process, the shear and heat imparted will result in the melting of the masterbatch and the distribution of the slip agent throughout a melt stream that will subsequently become one or more layers disclosed herein. Of course, other suitable methods for incorporating slip agents into the one or more layers may be used, taking into consideration the carrier resin, slip agent, compatibilizers, process aids, stabilizers, modifiers, pigments, and/or other components that may be included in the masterbatch formulation.

At Least One Outer Layer

In embodiments herein, the at least one outer layer independently comprising a second ethylene-α-olefin block copolymer and an antiblock agent. The second ethylene-α-olefin block copolymer may be an ethylene-α-olefin block copolymer as previously described herein. In some embodiments, the second ethylene-α-olefin block copolymer is an ethylene/octene block copolymer, wherein the ethylene content is greater than 80 mol. % of the whole polymer and the octene content is from 10 to 15 mol. %, or from 15 to 20 mol. % of the whole polymer. In some embodiments herein, the first ethylene α-olefin block copolymer is different from the second ethylene-α-olefin block copolymer.

In embodiments herein, the second ethylene-α-olefin block copolymer has a density of from 0.850 g/cc to 0.890 g/cc, from 0.850 g/cc to 0.885 g/cc, from 0.855 g/cc to 0.880 g/cc, or from 0.860 g/cc to 0.879 g/cc. The density of the first ethylene-α-olefin block copolymer is equal to or greater than the density of the second ethylene-α-olefin block copolymer. In some embodiments, the density of the polymer blend present in the core layer is equal to or greater than the density of the second ethylene-α-olefin block copolymer.

In embodiments herein, the second ethylene-α-olefin block copolymer has a melt index (MI) from 0.1 g/10 min to 25 g/10, 0.5 g/10 min to 25 g/10 min, 0.5 g/10 min to 20 g/10 min, 2 g/10 min to 20 g/10 min, 5 g/10 min to 20 g/10 min, or 5 g/10 min to 15 g/10 min, as measured by ASTM D 1238 (190° C./2.16 kg). In some embodiments, the melt index of the first ethylene-α-olefin block copolymer is different than the melt index of the second ethylene-α-olefin block copolymer.

The second ethylene-α-olefin block copolymer may independently comprise at least 55 wt. % of the at least one outer layer. For example, in some embodiments, the second ethylene-α-olefin block copolymer may independently comprise at least 60 wt. %, 65 wt. %, 70 wt. %, 75 wt. %, 80 wt. %, 85 wt. %, 90 wt. %, 95 wt. %, or 99 wt. % of the at least one outer layer.

The second ethylene-α-olefin block copolymer may have a low to moderate level of crystallinity. For example, in some embodiments, the second ethylene-α-olefin block copolymer has a crystallinity from a lower limit of 1%, 2% or 3% to an upper limit of 28%, 30%, or 35%. In embodiments herein, the crystallinity of the first ethylene-α-olefin block copolymer may be greater than or equal to the crystallinity of the second ethylene-α-olefin block copolymer.

The crystallinity may also be described in terms of thermal energy. The thermal energy (or heat of fusion) for 100% crystalline polypropylene is taken to be 165 J/g, and for 100% crystalline polyethylene is 292 J/gm. The second ethylene-α-olefin block copolymer may have a heat of fusion, as determined by DSC, ranging from a lower limit of about 1 Joules/gram (J/g), or 3 J/g, or 5 J/g, or 7 J/g, to an upper limit of about 100 J/g, 95 J/g, 90 J/g, or 85 J/g. In embodiments herein, the first ethylene-α-olefin block copolymer has a heat of fusion greater than or equal to the second ethylene-α-olefin block copolymer.

The level of crystallinity may also be reflected in the melting point. "Melting point" is determined by DSC. The second ethylene-α-olefin block copolymer may have one or more melting points, with the peak having the highest heat flow (i.e., tallest peak height) being considered the melting point. The second ethylene-α-olefin block copolymer may have a melting point, as determined by DSC, ranging from a lower limit of about 20° C., or 25° C., or 30° C., or 35° C., or 40° C. or 45° C. to an upper limit of about 135° C., or 130° C. In some embodiments, the melting point of the first ethylene-α-olefin block copolymer is equal to or greater than the melting point of the second ethylene-α-olefin block copolymer.

The at least one outer layer may comprise a polymer blend comprising the second ethylene-α-olefin block copolymer with one or more additional outer layer polymers suitable for melt processing in blown film, cast film, extrusion coating processes or enhancing or modifying elastic performance, which may include, for example, low density polyethylene suitable for improving processability, among other things, one or more additional ethylene-α-olefin block copolymers as described herein, ethylene or propylene random copolymers, such as, the AFFINITY™ and VERSIFY™ resins commercially available from The Dow Chemical Company, the EXACT™ or VISTAMAXX™ resins commercially available from Exxon Mobil Corporation, or suitable styrenic block copolymers, such as those marketed under the tradename KRATON™, and commercially available from Kraton Polymers, Inc.

In some embodiments, the at least one outer layer independently comprises a polymer blend comprising the second ethylene-α-olefin block copolymer and one or more additional ethylene-α-olefin block copolymers having a density of 0.850 g/cc to 0.890 g/cc and a melt index of 0.5 g/10 min to 25 g/10 min. In some embodiments, the density of the polymer blend in the at least one outer layer may be equal to or less than the density of the first ethylene-α-olefin block copolymer. In other embodiments, the density of the polymer blend in the at least one outer layer may be equal to or less than the density of the polymer blend in the core layer. In some embodiments, the one or more additional ethylene-α-olefin block copolymers present in the at least one outer layer may comprise less than 30 wt. %, less than 25 wt. %, less than 20 wt. %, less than 15 wt. %, less than 10 wt. %, or less than 5 wt. % of the at least one outer layer.

In embodiments herein, the at least one outer layer independently comprises an antiblock agent. Examples of suitable antiblock agents may include, but are not limited to, clay, aluminum silicate, diatomaceous earth, silica, talc, calcium carbonate, limestone, fumed silica, magnesium sulfate, magnesium silicate, alumina trihydrate, magnesium oxide, zinc oxide, titanium dioxide, or combinations thereof. In some embodiments, the antiblock agent is selected from the group consisting of talc, calcium carbonate, silica, nephilene syenite, and combinations thereof. Other suitable antiblock agents can be found in U.S. Pat. No. 7,741,397 and Zweifel Hans et al., "Plastics Additives Handbook," Hanser Gardner Publications, Cincinnati, Ohio, 5th edition, Chapter 7, pages 585-600 (2001), which are incorporated herein by reference.

The antiblock agent may be independently present in the at least one outer layer in amounts ranging from 2.5 wt. % to 30 wt. %. In some embodiments, the antiblock agent may be independently present in the at least one outer layer in amounts ranging from 2.5 wt. % to 25 wt. %, 2.5 wt. % to 20 wt. %, 2.5 wt. % to 18 wt. %, 3.5 wt. % to 18 wt. %, 5 wt. % to 20 wt. %, 5 wt. % to 18 wt. %, or 5 wt. to 15 wt. % of the at least one outer layer. Suitable methods for incorporating antiblock agents into a carrier resin are known to those of ordinary skill in the art and can include, for example, melt blending or solution blending, which may be performed using, for example, an extruder (single-screw, twin-screw) or static mixer. In some embodiments, an antiblock masterbatch containing the desired amount of antiblock agent is incorporated during the film preparation step by dry blending with other polymer resins. For example, in a melt extrusion process, the shear and heat imparted will result in the melting of the masterbatch and the distribution of the antiblock agent throughout a melt stream that will subsequently become one or more layers disclosed herein. Of course, other suitable methods for incorporating antiblock agents into the one or more layers may be used, taking into consideration the carrier resin, slip agent, compatibilizers, process aids, stabilizers, modifiers, pigments, and/or other components that may be included in the masterbatch formulation.

The at least one outer layer may optionally comprise one or more slip agents. Examples of suitable slip agents are outlined above. In some embodiments, the film further comprises a slip agent in the at least one outer layer. In other embodiments, the film further comprises a slip agent in the at least one outer layer, and optionally, in the core layer. In further embodiments, the film further comprises a slip agent in the at least one outer layer and the core layer. The total amount of the one or more slip agents independently present in the at least one outer layer may range from 0-1 wt. %. All individual values and subranges are included and disclosed herein. For example, in some embodiments, the total amount of the one or more slip agents present in the at least one outer layer is from 0-0.5 wt. %. In other embodiments, the total amount of the one or more slip agents present in the at least one outer layer is from 0.05-0.3 wt. %. Suitable methods for incorporating slip agents into a carrier resin are previously described above.

In some embodiments, compatibilizers may also be present in the at least one outer layer. Compatibilizers may be used for a variety of reasons including, increasing the ability of a polymer to wet the surface of antiblock agents. Polymeric compatibilizers may comprise polymers or blends thereof with functional groups, such as, polar functional groups. Suitable compatibilizers for the present invention include, but are not limited to, ethylene ethyl acrylate (AMPLIFY™ EA), maleic anhydride grafted polyethylene (AMPLIFY™ GR), ethylene acrylic acid (PRIMACOR™), ionomers (AMPLIFY™ IO), and other functional polymers (AMPLIFY™ TY), all of which are available from The Dow Chemical Company; maleic anhydride styrenic block copolymer (KRATON™ FG), available from Kraton Polymers; maleic anhydride grafted polyethylene, polypropylene, copolymers (EXXELOR™), available from The ExxonMobil Chemical Company; modified ethylene acrylate carbon monoxide terpolymers, ethylene vinyl acetates (EVAs), polyethylenes, metallocene polyethylenes, ethylene propylene rubbers and polypropylenes with acid, maleic anhydride, acrylate functionality (FUSABOND™ BYNEL™, NUCREL™, ELVALOY™, ELVAX™) and ionomers (SURLYN™), available from E. I. du Pont de Nemours and Company.

Optional Inner Layers

As noted above, in some embodiments herein the film may comprise an optional inner layer. The inner layer may comprise a third ethylene-α-olefin block copolymer, which may be an ethylene-α-olefin block copolymer as previously described herein. In some embodiments, the second ethylene α-olefin block copolymer is different from the third ethylene-α-olefin block copolymer. In other embodiments, the first ethylene α-olefin block copolymer is different from the third ethylene-α-olefin block copolymer. In further embodiments, the first and second ethylene α-olefin block copolymers are different from the third ethylene-α-olefin block copolymer.

In embodiments herein, the third ethylene-α-olefin block copolymer has a density of from 0.850 g/cc to 0.890 g/cc, from 0.850 g/cc to 0.885 g/cc, from 0.855 g/cc to 0.880 g/cc, or from 0.860 g/cc to 0.879 g/cc. In some embodiments, the third ethylene-α-olefin block copolymer has a density that is equal to or greater than the density of the second ethylene-α-olefin block copolymer. In embodiments herein, the third ethylene-α-olefin block copolymer has a melt index (MI) from 0.1 g/10 min to 10 g/10, 0.5 g/10 min to 5 g/10 min, 0.5 g/10 min to 3 g/10 min, 0.5 g/10 min to 2 g/10 min, 0.5 g/10 min to 1.5 g/10 min, 0.5 g/10 min to 1 g/10 min, or 0.5 g/10 min to less than 1 g/10 min, as measured by ASTM D 1238 (190° C./2.16 kg). In some embodiments, the third ethylene-α-olefin block copolymer is an ethylene/octene block copolymer, wherein the ethylene content is greater than 80 mol. % of the whole polymer and the octene content is from 10 to 15, or from 15 to 20 mol. % of the whole polymer.

The third ethylene-α-olefin block copolymer may comprise at least 50 wt. % of the inner layer. For example, in some embodiments, the third ethylene-α-olefin block copolymer may comprise at least 55 wt. % of the inner layer, 60 wt. % of the inner layer, 65 wt. % of the inner layer, 70 wt. % of the inner layer, 75 wt. % of the inner layer, at least 85 wt. % of the inner layer, at least 95 wt. % of the inner layer, at least 99 wt. % of the inner layer, or at least 100 wt. % of the inner layer.

In some embodiments, the inner layer may also comprise the third ethylene-α-olefin block copolymer and one or more additional polymers suitable for melt processing in blown film, cast film, extrusion coating processes or enhancing or modifying elastic performance, which may include, for example, low density polyethylene suitable for improving processability, among other things, one or more additional ethylene-α-olefin block copolymers as described herein, ethylene or propylene random copolymers, such as, the AFFINITY™ and VERSIFY™ resins commercially available from The Dow Chemical Company, the EXACT™ or VISTAMAXX™ resins commercially available from Exxon Mobil Corporation, or suitable styrenic block copolymers, such as those marketed under the tradename KRATON™, and commercially available from Kraton Polymers, Inc. The one or more additional polymers may comprise less than 30 wt. %, less than 25 wt. %, less than 20 wt. %, less than 15 wt. %, less than 10 wt. %, or less than 5 wt. % of the inner layer.

Similar to the core layer and the at least one outer layer, the inner layer may optionally comprise one or more slip agents as outlined above. In some embodiments, the film further comprises a slip agent in the inner layer. In other embodiments, the film further comprises a slip agent in the at least one outer layer and inner layer, and optionally, the core layer. In further embodiments, the film further comprises a slip agent in the at least one outer layer, the core layer, and the inner layer. The total amount of the one or more slip agents present in the inner layer may range from 0-1 wt. %. All individual values and subranges are included and disclosed herein. For example, in some embodiments, the total amount of the one or more slip agents present in the at least one outer layer is from 0-0.5 wt. %. In other embodiments, the total amount of the one or more slip agents present in the at least one outer layer is from 0.05-0.3 wt. %.

Films & Laminates

The film may further comprise non-polymeric additives that can be added to one or more layers. Exemplary additives may include, process oil, flow improvers, fire retardants, antioxidants, plasticizers, pigments, vulcanizing or curative agents, vulcanizing or curative accelerators, cure retarders, processing aids, UV stabilizers, antistats, pigments, flame retardants, tackifying resins, and the like. These compounds may include fillers and/or reinforcing materials. Other additives, which may be employed to enhance properties, include coloring agents. Lubricants, nucleating agents, reinforcements, and fillers (including granular, fibrous, or powder-like) may also be employed. The exemplary lists provided above are not exhaustive of the various kinds and types of additives that can be employed with the present invention.

In embodiments herein, the film may be a cast film or a blown film. The overall thickness of the film is not particularly limited, but, in some embodiments, may be less than 20 mils, less than 16 mils, less than 10 mils, or less than 5 mils. The thickness of any of the individual layers can vary widely, and may be determined by process, use and economic considerations.

It has been found that the films described herein may minimize the probability and severity of film blocking on rolls prior to lamination. Blocking refers to a defect in which film layers on a roll fuse or adhere together making the roll difficult to unwind for subsequent processing steps. Without intending to be bound by theory, it is believed that films described herein minimize the tendency of blocking by lowering temperature, pressure, various pressure points, in-wound tension, and surface area contact. It should be understood, however, that the need to minimize blocking is balanced against competing needs, such as, film handling, and other subsequent conversion steps. Various methods suitable for quantifying film blocking include ASTM D3354-11, ISO 11502, and others.

It has been found that the films described herein may exhibit a reduction in permanent set as compared to an identical film that has not been stretch-modified. In some embodiments, the film may exhibit a 2.5% reduction in permanent set as compared to an identical film that has not been stretch-modified. In other embodiments, the film may exhibit a 5% reduction in permanent set as compared to an identical film that has not been stretch-modified. In further embodiments, the film may exhibit a 7.5% reduction in permanent set as compared to an identical film that has not been stretch-modified. In even further embodiments, the film may exhibit a 10% reduction in permanent set as compared to an identical film that has not been stretch-modified.

It has been found that the films described herein may exhibit a first cycle retraction force that is greater than a first cycle retraction force of an identical film that has not been stretch-modified. In some embodiments, the film may exhibit a first cycle retraction force that is at least 25% greater than a first cycle retraction force of an identical film that has not been stretch-modified. In other embodiments, the film may exhibit a first cycle retraction force that is at least 30% greater than a first cycle retraction force of an identical film that has not been stretch-modified. In further embodiments, the film may exhibit a first cycle retraction force that is at least 35% greater than a first cycle retraction force of an identical film that has not been stretch-modified. In even further embodiments, the film may exhibit a first cycle retraction force that is at least 45% greater than a first cycle retraction force of an identical film that has not been stretch-modified. In even further embodiments, the film may exhibit a first cycle retraction force that is at least 50% greater than a first cycle retraction force of an identical film that has not been stretch-modified.

It has been found that the films described herein may exhibit a second cycle retraction force that is greater than a second cycle retraction force of an identical film that has not been stretch-modified. In some embodiments, the film may exhibit a second cycle retraction force that is at least 20% greater than a second cycle retraction force of an identical film that has not been stretch-modified. In other embodiments, the film may exhibit a second cycle retraction force that is at least 25% greater than a second cycle retraction force of an identical film that has not been stretch-modified. In further embodiments, the film may exhibit a second cycle retraction force that is at least 35% greater than a second cycle retraction force of an identical film that has not been stretch-modified. In even further embodiments, the film may exhibit a second cycle retraction force that is at least 45% greater than a second cycle retraction force of an identical film that has not been stretch-modified. In even further embodiments, the film may exhibit a second cycle retraction force that is at least 50% greater than a second cycle retraction force of an identical film that has not been stretch-modified.

It has been found that the films described herein may exhibit a haze value that is less than a haze value of an identical film that has not been stretched-modified. Without being bound by theory, it is believed that since the stretch-modified films do not undergo plastic deformation, they result in a decrease in surface roughness (due to differential recovery behavior), and therefore, a decrease in haze values. In some embodiments, the film may exhibit a haze value that is at least 2% less than a haze value of an identical film that has not been stretched-modified. In other embodiments, the film may exhibit a haze value that is at least 3% less than a haze value of an identical film that has not been stretched-modified. In further embodiments, the film may exhibit a haze value that is at least 5% less than a haze value of an identical film that has not been stretched-modified. Haze is measured according to ASTM D1003 using a HazeGard PLUS Hazemeter available from BYK Gardner of Melville, N.Y., with a light source CIE Illuminant C.

The films described herein may be used in a laminate. The laminated may comprise a substrate laminated to a side of the film. In some embodiments, the substrate may be a nonwoven. In other embodiments, the substrate may be an elastic nonwoven. In further embodiments, the substrate may be an extensible, non-elastic nonwoven. As used herein the term "laminate" refers to a composite structure of two or more sheet material layers that have been adhered through a bonding step, such as through adhesive bonding, thermal bonding, point bonding, pressure bonding, extrusion coating or ultrasonic bonding. For instance, a multilayered laminate may include some layers of nonwovens. As used herein, the term "nonwoven web," or "nonwoven fabric," or "nonwoven" refers to a web that has a structure of individual fibers or threads which are interlaid, but not in any regular, repeating manner. Nonwoven webs may be formed by a variety of processes, such as, for example, air laying processes, meltblowing processes, spunbonding processes and carding processes, including bonded carded web processes. "Meltblown" refers to the process of extruding a molten thermoplastic material through a plurality of fine, usually circular, die capillaries as molten threads or filaments into a high velocity gas (e.g., air) stream which attenuates the filaments of molten thermoplastic material to reduce their diameter, which may be to a microfiber diameter. Thereafter, the meltblown fibers are carried by the high velocity gas stream and are deposited on a collecting surface to form a web of randomly dispersed meltblown fibers. "Spunbonded" refers to the process of extruding a molten thermoplastic material as filaments from a plurality of fine, usually circular, capillaries of a spinneret with the diameter of the extruded filaments then being rapidly reduced by drawing the fibers and collecting the fibers on a substrate.

The nonwoven web may comprise a single web, such as a spunbond web, a carded web, an airlaid web, a spunlaced web, or a meltblown web. However, because of the relative strengths and weaknesses associated with the different processes and materials used to make nonwoven fabrics, composite structures of more than one layer are often used in order to achieve a better balance of properties. Such structures are often identified by letters designating the various lays such as SM for a two layer structure consisting of a spunbond layer and a meltblown layer, SMS for a three layer structure, or more generically $SX_nS$ structures, where "X" can be independently a spunbond layer, a carded layer, an airlaid layer, a spunlaced layer, or a meltblown layer and "n" can be any number, although for practical purposes is generally less than 5. In order to maintain structural integrity of such composite structures, the layers must be bonded together. Common methods of bonding include point bonding, adhesive lamination, and other methods known to those skilled in the art. All of these structures may be used in the present invention.

The nonwovens can also be laminates such as spunbond layers and some meltblown layers, such as a spunbond/meltblown/spunbond (SMS) laminate and others as disclosed in U.S. Pat. No. 4,041,203 to Brock et al., U.S. Pat. No. 5,169,706 to Collier, et al., U.S. Pat. No. 5,145,727 to Potts et al., U.S. Pat. No. 5,178,931 to Perkins et al., and U.S. Pat. No. 5,188,885 to Timmons et al., each incorporated by reference in their entirety. The nonwoven may be an elastic nonwoven comprised of elastic materials or an extensible nonwoven, such as, spunlaced materials which are hydroentangled spun-melt nonwovens. The nonwoven may be inelastic, but elongatable or extensible. Such inelastic nonwovens may be used in elastic laminates by bonding them to the elastic film while the elastic film is in a stretched condition so that when the elastic film is allowed to retract the nonwoven gathers or puckers between the portions where the nonwoven is bonded to the elastic film creating corrugations in the nonwovens. This live stretch process of lamination is described in U.S. Pat. No. 4,720,415. Other means of corrugating nonwovens are available commercially, such as those supplied by Micrex. Extensible, but inelastic nonwovens can also be used in elastic laminates through a process described as incremental stretching. In these processes the elastic film and extensible, but non-elastic nonwoven are joined in the unstretched state. The laminate is then subjected to stretching or tension as described in U.S. Pat. Nos. 5,167,897, 4,107,364, 4,209,463, and 4,525,407. When the tension is released on the web the nonwoven is permanently deformed in the areas where it was stretched and does not go back to its original shape so that the elastic laminate is now able to stretch and recover without significant constraint from the nonwoven in the areas where it has been pre-stretched.

The laminates may be formed by providing a multilayer film comprising a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc; and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc; wherein the density of the first ethylene-α-olefin block copolymer is equal to or greater than the density of the second ethylene-α-olefin block copolymer; performing a first stretch of the film in at least one direction to a draw ratio of at least 1.9 to form a stretch-modified multilayer film; and substantially relaxing the stretch-modified multilayer film in the at least one direction. In some embodiments, a first stretch of the film is performed in at least one direction a draw ratio of at least 3.6 to form the stretch-modified multilayer film. In other embodiments, a first stretch of the film is performed in at least one direction to a draw ratio of at least 4.5 to form the stretch-mofified multilayer film. In further embodiments, a first stretch of the film is performed in at least one direction to a draw ratio of at least 5.7 to form the stretch-modified multilayer film. In further embodiments, a first stretch of the film is performed in at least one direction to a draw ratio of at least 6.5 to form the stretch-modified multilayer film.

Stretching may be accomplished by methods known in the art, such as, ring rolling, tenter framing, incremental stretching, or other suitable methods known in the art. Examples of stretching methods can also be found in U.S. Patent or Publication Nos. 4,368,565, 5,143,679, 5,156,793, 5,167,897, 8,337,190, 2003/0088228, or 2004/0222553, all of which are herein incorporated by reference. For illustration purposes only, in some embodiments, stretching is accomplished through the use of at least one pair of intermeshed grooved rolls or intermeshed discs. See, for e.g., U.S. Pat. Nos. 4,153,751, 4,368,565, International App. No. WO 2004/020174, and U.S. Pub. No. 2006/0003656, all of which are herein incorporated by reference.

In some embodiments, the process further comprises laminating the stretch-modified multilayer film to at least one substrate to form a laminate. As previously noted herein the substrate may be a nonwoven, an elastic nonwoven, or an extensible, but non-elastic nonwoven. In some embodiments, the laminates may be formed using a process that is in-line with the stretching. The film may be sandwiched between two separate substrates or non-woven laminates.

The laminates may undergo subsequent processing steps to provide a finished, desired product. For example, in some embodiments, the laminate may be subjected to a second stretch in at least one direction to a draw ratio of 3.6 or less of its pre-second stretch length. Such methods are often applied to extensible, non-elastic nonwoven film laminates to make them more elastic. Examples of such similar stretching methods are described above. It should be understood that this step is optional, and in other embodiments, the laminate does not undergo a second stretch. Additional embodiments are described and illustrated in the accompanying figures.

Figure 1:
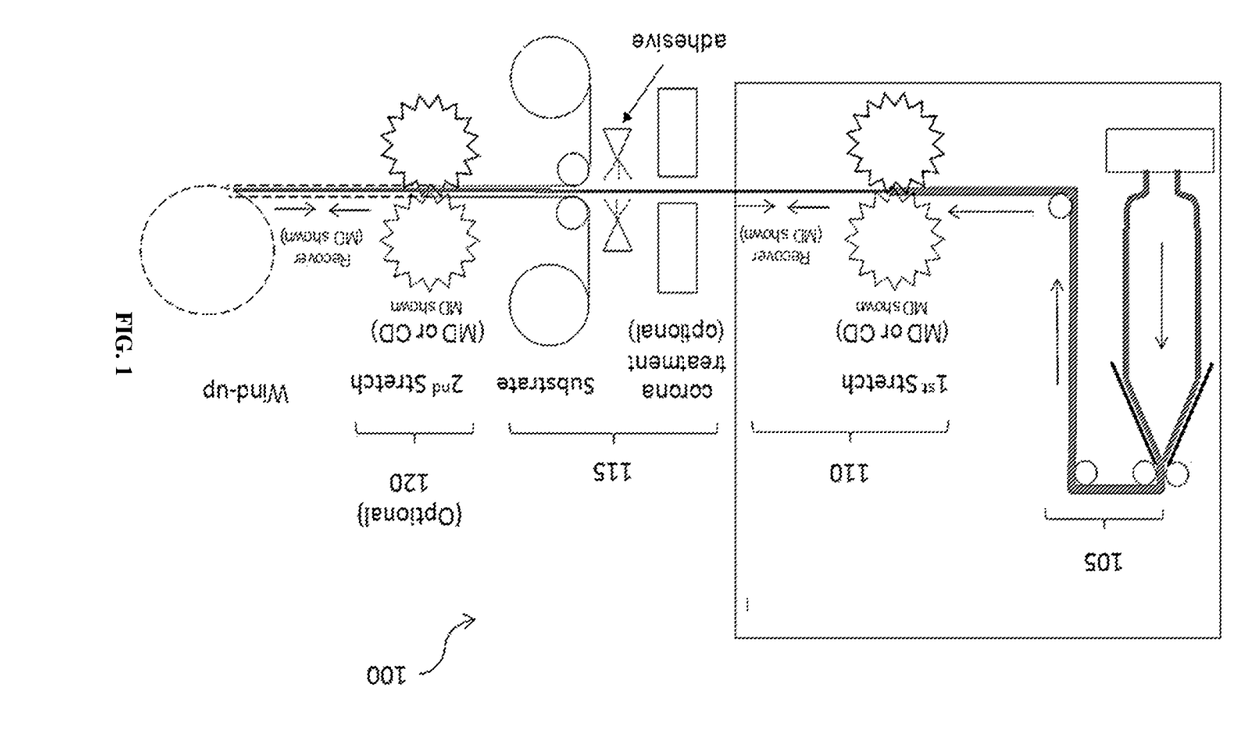
FIG. 1 schematically depicts an in-line blown film process that may be used to prepare stretch-modified multilayer films according to one or more embodiments shown and described herein.

Referring to FIG. 1, depicted is an in-line blown film process (100) that may be used to prepare stretch-modified multilayer films. In a first step (105), a multilayer blown film is coextruded. The multilayer film may comprise a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc; and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc, and wherein the density of the first ethylene-α-olefin block copolymer is equal to or greater than the density of the second ethylene-α-olefin block copolymer. In a second step (110), the multilayer blown film is then stretched in at least one direction to a draw ratio of at least 1.9 to form a stretch-modified multilayer film. The stretch-modified multilayer film is allowed to substantially relax in the at least one direction. In a third step (115), the stretch-modified multilayer film is laminated to at least one substrate to form a laminate.

In some embodiments, at least one of the surfaces of the stretch-modified multilayer film may optionally be treated by flame, plasma, or corona to improve properties, such as, adhesion or printability. Prior to lamination, an adhesive, for e.g., a hot melt adhesive, may also be optionally applied either to the stretch-modified multilayer film or substrate. Of course, other lamination techniques may be used, which may include laminating the stretch modified multilayer film via thermal bonding or ultrasonic bonding to another film or non-woven material. In an optional fourth step (120), the laminate may undergo a second stretch in at least one direction to a draw ratio of 3.6 or less. In some embodiments, the laminate does not undergo a second stretch. In embodiments where the laminate has undergone a second stretch, the laminate may be allowed to substantially relax in the at least one direction of the second stretch. The laminate may then be wound into a roll. It should be understood herein that the process shown and described in FIG. 1 is merely exemplary, and it would be obvious to those skilled in the art that various other changes and modifications can be made without departing from the spirit and scope of the invention. For example, each step may be performed continuously (i.e., in-line as shown), semi-continuously, or in separate unit operations. In some embodiments, an intermediate material may be produced that, in some examples, may be temporarily wound into a roll until it is ready further processing, at which point, the intermediate material is unwound and processed. The intermediate material may be produced after one or more process steps.

Figure 2:
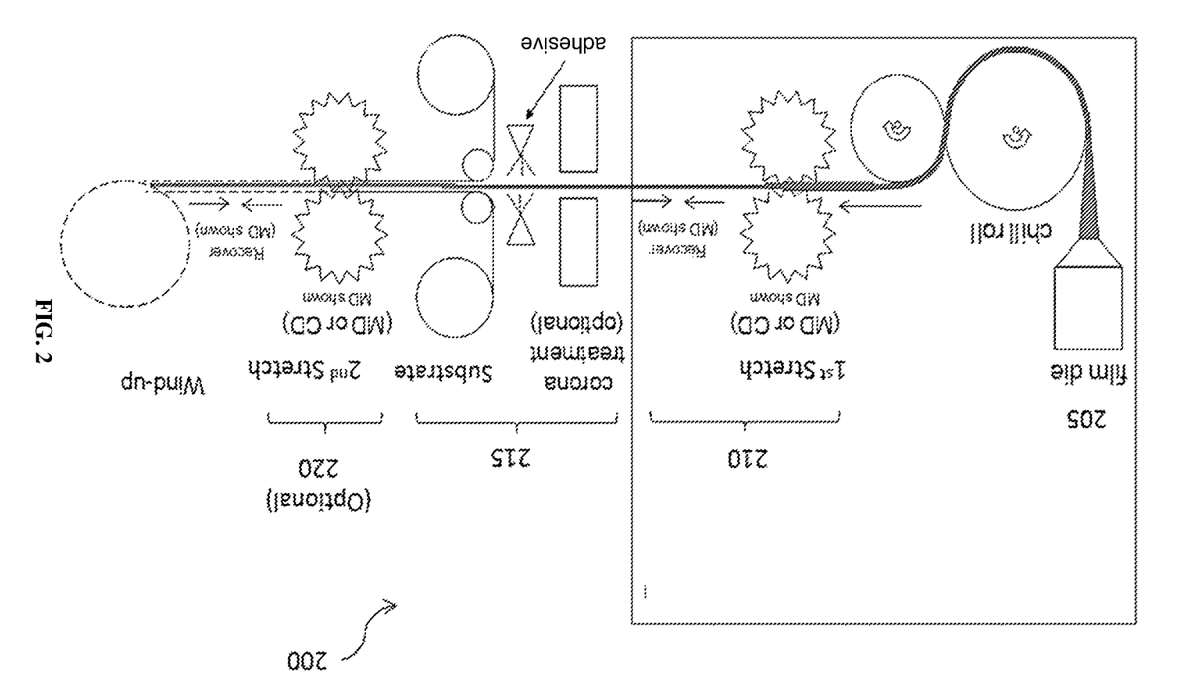
FIG. 2 schematically depicts an in-line cast extrusion film process that may be used to prepare stretch-modified multilayer films according to one or more embodiments shown and described herein.

Referring to FIG. 2, depicted is an in-line cast film process (200) that may be used to prepare stretch-modified multilayer films. In a first step (205), a multilayer cast film is coextruded. The multilayer film may comprise a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc; and at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc, and wherein the density of the first ethylene-α-olefin block copolymer is equal to or greater than the density of the second ethylene-α-olefin block copolymer. In a second step (210), the multilayer cast film is then stretched in at least one direction to a draw ratio of at least 1.9 to form a stretch-modified multilayer film. The stretch-modified multilayer film is allowed to substantially relax in the at least one direction. In a third step (215), the stretch-modified multilayer film is laminated to at least one substrate to form a laminate.

In some embodiments, at least one of the surfaces of the stretch-modified multilayer film may optionally be treated by flame, plasma, or corona to improve properties, such as, adhesion or printability. Prior to lamination, an adhesive, for e.g., a hot melt adhesive, may be optionally applied either to the stretch-modified multilayer film or substrate. Of course, as noted above, other lamination techniques may be used, which may include laminating the stretch modified multilayer film via thermal bonding or ultrasonic bonding to another film or non-woven material. In an optional fourth step (220), the laminate may undergo a second stretch in at least one direction to a draw ratio of 3.6 or less. In some embodiments, the laminate does not undergo a second stretch. In embodiments where the laminate has undergone a second stretch, the laminate may be allowed to substantially relax in the at least one direction of the second stretch. The laminate may then be wound into a roll. It should be understood herein that the process shown and described in FIG. 2 is merely exemplary, and it would be obvious to those skilled in the art that various other changes and modifica- tions can be made without departing from the spirit and scope of the invention. For example, each step may be performed continuously (i.e., in-line as shown), semi-continuously, or in separate unit operations. In some embodiments, an intermediate material may be produced that, in some examples, may be temporarily wound into a roll until it is ready further processing, at which point, the intermediate material is unwound and processed. The intermediate material may be produced after one or more process steps.

Test Methods

Unless otherwise stated, the following test methods are used. All test methods are current as of the filing date of this disclosure.

Density

The samples are prepared according to ASTM D1928. Measurements are made using ASTM D792, Method B.

Melt Index

Melt index, or $I_2$, is determined according to ASTM D1238 at 190° C., 2.16 kg.

Strain at Break and Stress at Break

Tensile specimens (prepared according to ASTM D638) were die cut from compression molded films. The specimen width is taken as 4.8 mm. The gauge length is taken as 22.25 mm. The strain and stress at break was measured with an INSTRON™ 5565 instrument equipped with a 100 N load cell and pneumatic grips under ambient conditions. The specimens were stretched at a constant speed of 500%/min (or about 111.25 mm/min) until sample failure. Five specimens were measured for each prepared film to determine the average and standard deviation of the strain at break and the stress at break.

Differential Scanning Calorimetry (DSC)

Baseline calibration of the TA DSC Q1000 was performed by using the calibration wizard in the software. First, a baseline was obtained by heating the cell from –80° C. to 280° C. without any sample in the aluminum DSC pan. After that, sapphire standards were used according to the instructions in the wizard. Then about 1-2 mg of a fresh indium sample was analyzed by heating the sample to 180° C., cooling the sample to 120° C. at a cooling rate of 10° C./min followed by keeping the sample isothermally at 120° C. for 1 min, followed by heating the sample from 120° C. to 180° C. at a heating rate of 10° C./min. The heat of fusion and the onset of melting of the indium sample were determined and checked to be within 0.5° C. from 156.6° C. for the onset of melting and within 0.5 J/g from 28.71 J/g for the heat of fusion. Then deionized water was analyzed by cooling a small drop of fresh sample in the DSC pan from 25° C. to –30° C. at a cooling rate of 10° C./min. The sample was kept isothermally at 30° C. for 2 minutes and heated to 30° C. at a heating rate of 10° C./min. The onset of melting was determined and checked to be within 0.5° C. from 0° C. Samples of polymer were then pressed into a thin film at a temperature of 177° F. About 5 to 8 mg of sample was weighed out and placed in a DSC pan. A lid was crimped on the pan to ensure a closed atmosphere. The sample pan was placed in the DSC cell and then heated at a high rate of about 100° C./min to a temperature of about 30° C. above the polymer melt temperature. The sample was kept at this temperature for 5 minutes. Then the sample was cooled at a rate of 10° C./min to –40° C. to generate a cooling curve, and kept isothermally at that temperature for 5 minutes. Consequently the sample was heated at a rate of 10° C./min until melting was complete to generate a 2nd heating curve. The DSC melting peak is measured as the maximum in heat flow rate (W/g) with respect to the linear baseline drawn between –30° C. and the end of melting for the $2^{nd}$ heating curve. The heat of fusion is measured as the area under the melting curve between –30° C. and the end of melting using a linear baseline. The % crystallinity for polyethylene resins may be calculated using the following equation:

$$\% \text{ Crystallinity} = \frac{\text{Heat of fusion(J/g)}}{292 \text{ J/g}} \times 100\%$$

Ethyl Acrylate Content %

The ethyl acrylate content weight % is measured according to ASTM D3594.

Permanent Set

The films were measured in the cross direction orientation with an INSTRON™ 5565 instrument equipped with a 100 N load cell and pneumatic grips under ambient conditions. Four 1 inch×5 inch specimens were cut from blown films and each sample was placed in the tensile tester jaws with a 1 inch gauge length. The specimen thickness is specified in Table 8 below. The specimens were initially stretched to achieve a pre-force load of 0.05 N at a speed of 50 mm/min. The specimens were then elongated to an applied strain of 200% at a constant speed of 250 mm/min, then held at a 200% strain for 30 seconds. The specimens were then unloaded to 0% strain at the same speed (250 mm/min) and then held for 60 seconds. The specimens were then re-stretched to an applied strain of 200% at the same speed (250 mm/min), held for 30 seconds, and unloaded back to 0% strain at the same speed (250 mm/min), thus completing two load and unload cycles. Three specimens were tested for each film at the maximum applied strain of 200%. The permanent set was determined as applied strain on the second load cycle at which the stress was 0.1 N.

First and Second Cycle Retraction & Extension Force

The films were measured in the cross direction orientation with an INSTRON™ 5565 instrument equipped with a 100 N load cell and pneumatic grips under ambient conditions. Four 1 inch×5 inch specimens were cut from blown films and each sample was placed in the tensile tester jaws with a 1 inch gauge length. The specimen thickness is specified in Table 8 below. The specimens were initially stretched to achieve a pre-force load of 0.05 N at a speed of 50 mm/min. The specimens were then elongated to an applied strain of 200% at a constant speed of 250 mm/min, then held at a 200% strain for 30 seconds. The specimens were then unloaded to 0% strain at the same speed (250 mm/min) and then held for 60 seconds. The specimens were then re-stretched to an applied strain of 200% at the same speed (250 mm/min), held for 30 seconds, and unloaded back to 0% strain at the same speed (250 mm/min), thus completing two load and unload cycles. At least three trials were tested for each maximum applied strain. The extension force at strain levels of 50% were recorded for the first and second load cycles. The retraction force at strain levels of 50% were recorded for the first and second unload cycles. Three specimens were tested for each film at the maximum applied strain of 200%. The extension stress and retraction stress at strain levels of 50% were recorded for the first and second load and unload cycles.

Haze Value

Total haze is measured on the films using a BYK Gardner Haze-gard based on ASTM D1003, Procedure A.

EXAMPLES

The embodiments described herein may be further illustrated by the following non-limiting examples. The following materials are used in the Examples described below.

Preparation of Inventive & Comparative Films

Three layer blown films were made using a five layer Labtech blown film line (Labtech Engineering Company LTD, Thailand). Layer I corresponds to a first outer layer, layers II, III, and IV correspond to the core layer, and layer V corresponds to a second outer layer. The blown films were produced according to the specifications below in Tables 3A, 4A, & 5A. The composition of each layer in the three layer blown films produced is outlined below in Table 6, films 1-8.

Three layer cast films were made using a Cloeren five layer Feedblock and die. Layer I corresponds to a first outer layer, layers II, III, and IV correspond to the core layer, and layer V corresponds to a second outer layer. The cast films were produced according to the specifications below in Tables 3B, 4B, & 5B. The composition of each layer in the three layer cast films produced is outlined below in Table 6, films 9 & 10.

TABLE 1

Resins

| Resin | Label | Density (g/cm³) | MI (I₂) (g/10 min) | Melting Point (° C.) | Ethyl Acrylate Content (wt. %) | Description |
|---|---|---|---|---|---|---|
| INFUSE ™ 9007 | A | 0.866 | 0.5 | 119 | | ethylene-octene block copolymer |
| INFUSE ™ 9507 | B | 0.866 | 5 | 119 | | ethylene-octene block copolymer |
| INFUSE ™ 9807 | C | 0.866 | 15 | 118 | | ethylene-octene block copolymer |
| INFUSE ™ 9530 | D | 0.877 | 5 | 119 | | ethylene-octene block copolymer |
| AMPLIFY ™ EA 101 | E | 0.931 | 6 | 97.8 | 18.5 | ethylene ethyl acrylate |
| AMPLIFY ™ EA 103 | F | 0.93 | 21 | 95 | 19.5 | ethylene ethyl acrylate |
| LDPE | G | 0.918 | 8 | 107 | | low density polyethylene |
| INFUSE ™ 9817 | H | 0.877 | 15 | 118 | | ethylene-octene block copolymer |
| INFUSE ™ 9107 | I | 0.866 | 1 | 119 | | ethylene-octene block copolymer |

The INFUSE ™, AMPLIFY ™ and resins are commercially available from The Dow Chemical Company (Midland, MI, USA).

TABLE 2

Additives

| | Label | Component | Component | Density (g/cm³) | MI (g/10 min) | Loading (wt %) |
|---|---|---|---|---|---|---|
| Antiblock | AB1 | INFUSE ™ 9507 | B | 0.866 | 5 | 45 |
| | | AMPLIFY ™ EA 101 | E | 0.931 | 6 | 5 |
| | | Talc (surface treated) | Talc | 2.705 | — | 50 |
| | AB2 | INFUSE ™ 9807 | C | 0.866 | 15 | 45 |
| | | AMPLIFY ™ EA 103 | F | 0.93 | 21 | 5 |
| | | Talc (surface treated) | Talc | 2.705 | — | 50 |
| | AB3 | INFUSE ™ 9817 | H | 0.877 | 15 | 45 |
| | | AMPLIFY ™ EA 103 | F | 0.93 | 21 | 5 |
| | | Nepheline Syenite | | 2.61 | — | 50 |
| Slip | S1 | Erucamide | Erucamide | 0.877 | — | 5 |
| | | INFUSE ™ 9530 | D | | 5 | 95 |
| | S2 | Erucamide | Erucamide | 0.918 | — | 5 |
| | | LDPE | G | | 8 | 92 |

TABLE 3A

Blown Film Line Equipment
5-Layer Line Specifications

2 × 25 mm extruders (outer layers)
3 × 20 mm extruders (core layer)
75 mm film die diameter
30/10/20/10/30 layer ratio
550 mm width tower
Slitter, dual turret winder
Typical rate: 35-40 lbs/hr

TABLE 3B

Cast Film Line Equipment
5-Layer Line Specifications

2 × 50 mm extruders (outer layers)
3 × 57 mm extruders (core layer)
914 mm film auto gauge die
Scantec X-Ray gauge scanner
Air knife and vacuum box

TABLE 4A

Blown Film Extruder Conditions

| Extruder No. | Extruder Specifications | Barrel Temperature No. | Temp. (° F.) | Extruder Speed (rpm) |
|---|---|---|---|---|
| 1 | Die temperature: 420° F. | 1 | 270 | 13.4 |
|   | Melt temperature: 408° F. | 2 | 300 | |
|   | Pressure: 1946 psi | 3 | 375 | |
|   | Speed: 15 rpm | 4 | 375 | |
|   | Current: 64% | | | |
| 2 | Die temperature: 420° F. | 1 | 270 | 49.0 |
|   | Melt temperature: 427° F. | 2 | 300 | |
|   | Pressure: 5223 psi | 3 | 375 | |
|   | Speed: 46 rpm | | | |
|   | Current: 79% | | | |
| 3 | Die temperature: 420° F. | 1 | 270 | 134.6 |
|   | Melt temperature: 419° F. | 2 | 300 | |
|   | Pressure: 5432 psi | 3 | 375 | |
|   | Speed: 45 rpm | | | |
|   | Current: 85% | | | |
| 4 | Die temperature: 420° F. | 1 | 270 | 45.7 |
|   | Melt temperature: 417° F. | 2 | 300 | |
|   | Pressure: 5230 psi | 3 | 375 | |
|   | Speed: 135 rpm | | | |
|   | Current: 80% | | | |
| 5 | Die temperature: 420° F. | 1 | 270 | 14.8 |
|   | Melt temperature: 411° F. | 2 | 300 | |
|   | Pressure: 1327 psi | 3 | 375 | |
|   | Speed: 14 rpm | 4 | 375 | |
|   | Current: 63% | | | |

TABLE 4B

Cast Film Extruder Conditions

| Extruder No. | Extruder Specifications | Barrel Temperature No. | Temp. (° F.) | Extruder Speed (rpm) |
|---|---|---|---|---|
| 1 | Die temperature: 400° F. | 1 | 299.7 | 35.3 |
|   | Melt temperature: 416.3° F. | 2 | 398.8 | |
|   | Pressure: 1946 psi | 3 | 399.4 | |
|   | Speed: 15 rpm | 4 | 400.5 | |
|   | Current: 64% | | | |
| 2 | Die temperature: 400° F. | 1 | 299.3 | 19.3 |
|   | Melt temperature: 340.7° F. | 2 | 399.9 | |
|   | Pressure: 5223 psi | 3 | 399.4 | |
|   | Speed: 46 rpm | 4 | 399.6 | |
|   | Current: 79% | 5 | 400.5 | |
| 3 | Die temperature: 400° F. | 1 | 299.1 | 26.2 |
|   | Melt temperature: 406.2° F. | 2 | 398.8 | |
|   | Pressure: 5432 psi | 3 | 398.8 | |
|   | Speed: 45 rpm | 4 | 399.7 | |
|   | Current: 85% | 5 | 400.8 | |
| 4 | Die temperature: 400° F. | 1 | 299.7 | 23.9 |
|   | Melt temperature: 400.3° F. | 2 | 398.8 | |
|   | Pressure: 5230 psi | 3 | 398.8 | |
|   | Speed: 135 rpm | 4 | 399.7 | |
|   | Current: 80% | 5 | 400.3 | |
| 5 | Die temperature: 400° F. | 1 | 299.5 | 36.2 |
|   | Melt temperature: 671.5° F. | 2 | 399.2 | |
|   | Pressure: 1327 psi | 3 | 399.7 | |
|   | Speed: 14 rpm | 4 | 400.6 | |
|   | Current: 63% | | | |

TABLE 5A

Blown Film Conditions

| | Temperature (° F.) |
|---|---|
| Mandrel | 440 |
| Layer 5 | 433 |
| Layer 4 | 433 |
| Layer 3 | 433 |
| Layer 2 | 440 |
| Layer 1 | 440 |
| Pipe 5 | 440 |
| Pipe 4 | 440 |
| Pipe 3 | 440 |
| Pipe 2 | 440 |
| Pipe 1 | 440 |
| Blower Speed (rpm) | 1723 |
| Line Speed (ft/min) | 18.0 |
| Film lay flat width | 12" |
| Single Ply Film Thickness (mil) | 2 |

TABLE 5B

Cast Film Conditions

| | Temperature (° F.) |
|---|---|
| Die Front Zone 1 | 400.5 |
| Die Front Zone 2 | 401 |
| Die Front Zone 3 | 400.8 |
| Die Front Zone 4 | 400.3 |
| Die Front Zone 5 | 400.3 |
| Die Back Zone 1 | 400.5 |
| Die Back Zone 2 | 400.5 |
| Die Back Zone 3 | 400.6 |
| Die Back Zone 4 | 400.1 |
| Die Back Zone 5 | 400.5 |
| Cast Roll | 69.3 |
| Chill Roll | 68.5 |
| Air knife speed | 40 |
| Line Speed (ft/min) | 135 |
| Single Ply Film Thickness (mil) | 2.5 |

TABLE 6

Multilayer Films

Multilayer Blown Film 1

| Component | Skin layer (10 wt. %) | Core Layer (80 wt. %) | Skin layer (10 wt. %) |
|---|---|---|---|
| A | 86% | 96% | 86% |
| AB1 | 10% | — | 10% |
| AB2 | — | — | — |
| S1 | — | — | — |
| S2 | 4% | 4% | 4% |

Multilayer Blown Film 2

| Component | Skin layer (10 wt. %) | Core Layer (80 wt. %) | Skin layer (10 wt. %) |
|---|---|---|---|
| A | 66% | 96% | 66% |
| AB1 | 30% | — | 30% |
| AB2 | — | — | — |
| S1 | — | — | — |
| S2 | 4% | 4% | 4% |

Multilayer Blown Film 3

| Component | Skin layer (10 wt. %) | Core Layer (80 wt. %) | Skin layer (10 wt. %) |
|---|---|---|---|

TABLE 6-continued

Multilayer Films

| A | 86% | 96% | 86% |
|---|---|---|---|
| AB1 | 10% | — | 10% |
| AB2 | — | — | — |
| S1 | 4% | 4% | 4% |
| S2 | — | — | — |

Multilayer Blown Film 4

| Component | Skin layer (10 wt. %) | Core Layer (80 wt. %) | Skin layer (10 wt. %) |
|---|---|---|---|
| A | 66% | 96% | 66% |
| AB1 | 30% | — | 30% |
| AB2 | — | — | — |
| S1 | 4% | 4% | 4% |
| S2 | — | — | — |

Multilayer Blown Film 5

| Component | Skin layer (10 wt. %) | Core Layer (80 wt. %) | Skin layer (10 wt. %) |
|---|---|---|---|
| A | 86% | 96% | 86% |
| AB1 | — | — | — |
| AB2 | 10% | — | 10% |
| S1 | — | — | — |
| S2 | 4% | 4% | 4% |

Multilayer Blown Film 6

| Component | Skin layer (10 wt. %) | Core Layer (80 wt. %) | Skin layer (10 wt. %) |
|---|---|---|---|
| A | 66% | 96% | 66% |
| AB1 | — | — | — |
| AB2 | 30% | — | 30% |
| S1 | — | — | — |
| S2 | 4% | 4% | 4% |

Multilayer Blown Film 7

| Component | Skin layer (10 wt. %) | Core Layer (80 wt. %) | Skin layer (10 wt. %) |
|---|---|---|---|
| A | 86% | 96% | 86% |
| AB1 | — | — | — |
| AB2 | 10% | — | 10% |
| S1 | 4% | 4% | 4% |
| S2 | — | — | — |

Multilayer Blown Film 8

| Component | Skin layer (10 wt. %) | Core Layer (80 wt. %) | Skin layer (10 wt. %) |
|---|---|---|---|
| A | 66% | 96% | 66% |
| AB1 | — | — | — |
| AB2 | 30% | — | 30% |
| S1 | 4% | 4% | 4% |
| S2 | — | — | — |

Multilayer Cast Film 9

| Component | Skin layer (20 wt. %) | Core Layer (60 wt. %) | Skin layer (20 wt. %) |
|---|---|---|---|
| I | 51% | 96% | 51% |
| AB3 | 45% | — | 45% |
| S1 | 4% | 4% | 4% |

Multilayer Cast Film 10

| Component | Skin layer (20 wt. %) | Core Layer (60 wt. %) | Skin layer (20 wt. %) |
|---|---|---|---|
| B | 51% | 96% | 51% |
| AB3 | 45% | — | 45% |
| S1 | 4% | 4% | 4% |

The blown films were collapsed into a two ply web and not slit. The 2-ply films underwent a first stretch in a cross-direction stretching machine available from Biax-Fiberfilm Corporation (Neenah, Wis., USA). The Biax cross-direction stretching machine is described in U.S. Pat. No. 4,368,565 and the cross-direction draw ratio is calculated as described above. The width (w) or distance between the discs (center-to-center) as illustrated in FIG. 3 of the '892 patent was set at 0.135 in. The groove depth (d) or depth of engagement of the interdigitating disc was set to 0.106 in, 0.233 in, and 0.377 in order to achieve draw ratios (l/w) of 1.9, 3.6, and 5.7, respectively.

The cast films underwent a first stretch in a cross-direction stretching machine available from Biax-Fiberfilm Corporation (Neenah, Wis., USA). The Biax cross-direction stretching machine is described in U.S. Pat. No. 4,368,565 and the cross-direction draw ratio is calculated as described above. The width (w) or distance between the discs (center-to-center) as illustrated in FIG. 3 of the '892 patent was set at 0.135 in. The groove depth (d) or depth of engagement of the interdigitating disc was set to 0.323 in order to achieve a draw ratio (l/w) of 4.96.

Tensile Test Results

The inventive films are stretch-modified (i.e., the films received a first stretch). The comparative films are identical to the inventive films, but have not been stretch-modified (i.e., did not receive a first stretch). The film numbers for the comparative and inventive films correspond to the multilayer film formulations disclosed in Table 6. The first stretch draw ratios are outlined in Table 7 below, while the comparative films do not undergo a first stretch. The data in Tables 7A & 7B illustrates that the strain at break and stress at break are not adversely affected for the stretch-modified inventive films as compared to the comparative films. Also shown in Table 7A are the stress-strain data at various draw ratios (1.9, 3.6, and 5.7) and in Table 7B the stress-strain data at a draw ratio of 4.96.

TABLE 7A

Blown Film Stress-Strain Data

| Film | 1st Stretch Draw Ratio (l/w) | Thickness (mm) | 50% Mod (MPa) | 100% Mod (MPa) | 200% Mod (MPa) | 400% Mod (MPa) | Strain at Break (%) | Stress at Break (MPa) |
|---|---|---|---|---|---|---|---|---|
| Comp 1 | 0 | 0.105 | 1.5199 | 1.75 | 2.09 | 2.83 | 1372.17 | 18.76 |
| Comp 2 | 0 | 0.102 | 1.4744 | 1.7 | 2.07 | 2.82 | 1320 | 16.39 |

TABLE 7A-continued

Blown Film Stress-Strain Data

| Film | 1st Stretch Draw Ratio (l/w) | Thickness (mm) | 50% Mod (MPa) | 100% Mod (MPa) | 200% Mod (MPa) | 400% Mod (MPa) | Strain at Break (%) | Stress at Break (MPa) |
|---|---|---|---|---|---|---|---|---|
| Comp 6 | 0 | 0.095 | 1.5645 | 1.81 | 2.21 | 3.06 | 1249.17 | 17.69 |
| Comp 7 | 0 | 0.101 | 1.2626 | 1.49 | 1.84 | 2.6 | 1198.83 | 14.65 |
| Comp 8 | 0 | 0.102 | 1.3731 | 1.61 | 1.99 | 2.74 | 1153 | 13.48 |
| Inv. 1 | 1.9 | 0.101 | 1.5062 | 1.76 | 2.12 | 2.89 | 1172.5 | 14.68 |
| Inv. 2 | 1.9 | — | — | — | — | — | — | — |
| Inv. 6 | 1.9 | — | — | — | — | — | — | — |
| Inv. 7 | 1.9 | — | — | — | — | — | — | — |
| Inv. 8 | 1.9 | 0.099 | 1.4385 | 1.7 | 2.12 | 2.95 | 1093.5 | 13.71 |
| Inv. 1A | 3.6 | 0.094 | 1.5128 | 1.77 | 2.22 | 3.2 | 1135.83 | 16.33 |
| Inv. 2A | 3.6 | — | — | — | — | — | — | — |
| Inv. 6A | 3.6 | — | — | — | — | — | — | — |
| Inv. 7A | 3.6 | — | — | — | — | — | — | — |
| Inv. 8A | 3.6 | 0.090 | 1.6081 | 1.9 | 2.4 | 3.47 | 1064.17 | 15.32 |
| Inv. 1B | 5.7 | 0.088 | 1.4138 | 1.73 | 2.26 | 3.6 | 941.17 | 16.24 |
| Inv. 2B | 5.7 | 0.083 | 1.5383 | 1.87 | 2.4 | 3.77 | 946.33 | 16.69 |
| Inv. 6B | 5.7 | 0.089 | 1.4662 | 1.78 | 2.3 | 3.73 | 936 | 16.53 |
| Inv. 7B | 5.7 | 0.081 | 1.6126 | 1.95 | 2.51 | 3.83 | 968.83 | 18.25 |
| Inv. 8B | 5.7 | 0.087 | 1.5147 | 1.83 | 2.31 | 3.5 | 984.33 | 15.73 |

TABLE 7B

Cast Film Stress-Strain Data

| Film | 1st Stretch Draw Ratio (l/w) | Thickness (mm) | Strain at Break (%) | Stress at Break (MPa) |
|---|---|---|---|---|
| Comp. 9 | 0 | 0.070 | 960.35 | 8.18 |
| Comp 10 | 0 | 0.066 | 1250 | Did not break |
| Inv. 9A | 4.96 | 0.062 | 816.35 | 11.27 |
| Inv. 9B | 4.96 | 0.056 | 915.58 | 8.71 |

Hysteresis Test Results

The hysteresis test results are shown below in Tables 8A & 8B. The % change in permanent set (PS) is determined as follows:

$$\% \text{ Change in } PS = \frac{(PS \text{ of Inv. Film}) - (PS \text{ of Comp. Film})}{(PS \text{ of Comp. Film})} \times 100\%$$

The % change in first cycle retraction force (1st RF) is determined as follows:

$$\% \text{ Change in } 1^{st} RF = \frac{(1^{st} RF \text{ of Inv. Film}) - (1^{st} RF \text{ of Comp. Film})}{(1^{st} RF \text{ of Comp. Film})} \times 100\%$$

TABLE 8A

Blown Film Hysteresis Data

| Film | 1st Stretch Draw Ratio (l/w) | Thickness (mm) | PS (%) | 50% Extension Stress Cycle 1 (MPa) | 50% Retraction Stress Cycle 1 (MPa) | 50% Extension Stress Cycle 2 (MPa) | 50% Retraction Stress Cycle 2 (MPa) | % Change in PS | % Change in RF (Cycle 1) |
|---|---|---|---|---|---|---|---|---|---|
| Comp 1 | 0 | 0.105 | 28.72 | 1.439 | 0.05 | 0.647 | 0.02 | n/a | n/a |
| Comp 2 | 0 | 0.102 | 30.915 | 1.521 | 0.031 | 0.642 | 0.002 | n/a | n/a |

TABLE 8A-continued

Blown Film Hysteresis Data

| Film | 1st Stretch Draw Ratio (l/w) | Thickness (mm) | PS (%) | 50% Extension Stress Cycle 1 (MPa) | 50% Retraction Stress Cycle 1 (MPa) | 50% Extension Stress Cycle 2 (MPa) | 50% Retraction Stress Cycle 2 (MPa) | % Change in PS | % Change in RF (Cycle 1) |
|---|---|---|---|---|---|---|---|---|---|
| Comp 6 | 0 | 0.095 | 27.428 | 1.523 | 0.092 | 0.709 | 0.055 | n/a | n/a |
| Comp 7 | 0 | 0.101 | 20.064 | 1.245 | 0.19 | 0.687 | 0.161 | n/a | n/a |
| Comp 8 | 0 | 0.102 | 27.865 | 1.396 | 0.1 | 0.648 | 0.07 | n/a | n/a |
| Inv. 1 | 1.9 | 0.101 | 29.208 | 1.479 | 0.043 | 0.616 | 0.01 | 1.7% | −14% |
| Inv. 2 | 1.9 | — | — | — | — | — | — | — | — |
| Inv. 6 | 1.9 | — | — | — | — | — | — | — | — |
| Inv. 7 | 1.9 | — | — | — | — | — | — | — | — |
| Inv. 8 | 1.9 | 0.099 | 25.266 | 1.387 | 0.149 | 0.691 | 0.112 | −9.3% | 49% |
| Inv. 1A | 3.6 | 0.094 | 27.302 | 1.42 | 0.091 | 0.638 | 0.054 | −4.9% | 82% |
| Inv. 2A | 3.6 | — | — | — | — | — | — | — | — |
| Inv. 6A | 3.6 | — | — | — | — | — | — | — | — |
| Inv. 7A | 3.6 | — | — | — | — | — | — | — | — |
| Inv. 8A | 3.6 | 0.090 | 22.725 | 1.379 | 0.186 | 0.734 | 0.151 | −18.4% | 86% |
| Inv. 1B | 5.7 | 0.088 | 25.615 | 1.398 | 0.138 | 0.663 | 0.096 | −10.8% | 176% |
| Inv. 2B | 5.7 | 0.083 | 22.532 | 1.447 | 0.166 | 0.753 | 0.131 | −27.1% | 435% |
| Inv. 6B | 5.7 | 0.089 | 23.994 | 1.445 | 0.154 | 0.723 | 0.117 | −12.5% | 67% |
| Inv. 7B | 5.7 | 0.081 | 20.082 | 1.27 | 0.211 | 0.705 | 0.18 | 0.1% | 11% |
| Inv. 8B | 5.7 | 0.087 | 24.656 | 1.413 | 0.174 | 0.708 | 0.14 | −11.5% | 74% |

TABLE 8B

Cast Film Hysteresis Data

| Film | 1st Stretch Draw Ratio (l/w) | Thickness (mm) | PS (%) | 50% Extension Stress Cycle 1 (MPa) | 50% Retraction Stress Cycle 1 (MPa) | 50% Extension Stress Cycle 2 (MPa) | 50% Retraction Stress Cycle 2 (MPa) | % Change in PS | % Change in RF (Cycle 1) |
|---|---|---|---|---|---|---|---|---|---|
| Comp. 9 | 0 | 0.070 | 6.94 | 1.445 | 0.650 | 1.115 | 0.626 | n/a | n/a |
| Comp. 10 | 0 | 0.066 | 8.27 | 1.481 | 0.634 | 1.112 | 0.6221 | n/a | n/a |
| Inv. 9 | 4.96 | 0.062 | 5.59 | 1.498 | 0.659 | 1.174 | 0.634 | −19.4 | 1.4 |
| Inv. 10 | 4.96 | 0.056 | 2.71 | 1.318 | 0.600 | 1.047 | 0.577 | −67.2 | −5.3% |

The data in Tables 8A & 8B illustrates that a % reduction in permanent set may occur for the stretch-modified inventive films as compared to the comparative film.

Haze Test Results

The haze results are shown below in Table 9 and show a decrease in haze as the films undergo a first stretch.

TABLE 9

Blown Film Haze Data

| Film | 1st Stretch Draw Ratio (l/w) | Haze (%) |
|---|---|---|
| Comp 2 | 0 | 90.6 |
| Comp 4 | 0 | 94.3 |

TABLE 9-continued

Blown Film Haze Data

| Film | 1st Stretch Draw Ratio (l/w) | Haze (%) |
|---|---|---|
| Comp 5 | 0 | 51.7 |
| Comp 7 | 0 | 62.1 |
| Inv. 2 | 1.9 | 83.3 |
| Inv. 4 | 1.9 | 89.7 |
| Inv. 5 | 1.9 | 43.3 |
| Inv. 7 | 1.9 | 54.9 |
| Inv. 2A | 3.6 | 85.0 |
| Inv. 4A | 3.6 | 90.7 |
| Inv. 5A | 3.6 | 40.7 |
| Inv. 7A | 3.6 | 54.6 |

TABLE 9-continued

Blown Film Haze Data

| Film | 1st Stretch Draw Ratio (l/w) | Haze (%) |
|---|---|---|
| Inv. 2B | 5.7 | 86.3 |
| Inv. 4B | 5.7 | 88.5 |
| Inv. 5B | 5.7 | 47.1 |
| Inv. 7B | 5.7 | 52.9 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A stretch-modified elastomeric multilayer film comprising:
   a core layer comprising a first ethylene-α-olefin block copolymer, wherein the first ethylene-α-olefin block copolymer comprises at least 50 mol. % ethylene, has a melt index ($I_2$) from 0.5 g/10 min to 5 g/10 min, and has a density of 0.850 g/cc to 0.890 g/cc; and
   at least one outer layer independently comprising a second ethylene-α-olefin block copolymer and from 2.5 to 30 wt. % of an antiblock agent, wherein the second ethylene-α-olefin block copolymer comprises at least 50 mol. % ethylene, has a melt index ($I_2$) from 0.5 g/10 min to 25 g/10 min, and has a density of 0.850 g/cc to 0.890 g/cc;
   wherein the density of the first ethylene-α-olefin block copolymer is equal to or greater than the density of the second ethylene-α-olefin block copolymer.

2. The film of claim 1, wherein the first ethylene α-olefin block copolymer is different from the second ethylene-α-olefin block copolymer.

3. The film of claim 1, wherein the film further comprises a slip agent in the at least one outer layer, and optionally, in the core layer.

4. The film of claim 1, wherein the melt index of the first ethylene-α-olefin block copolymer is different than the melt index of the second ethylene-α-olefin block copolymer.

5. The film of claim 1, wherein the film exhibits a reduction in permanent set as compared to an identical film that has not been stretch-modified.

6. The film of claim 1, wherein the film exhibits a first cycle retraction force that is at least 25% greater than a first cycle retraction force of an identical film that has not been stretch-modified.

7. The film of claim 1, wherein the film is a blown film or a cast film.

8. A laminate comprising the stretch-modified elastomeric multilayer film of claim 1.

9. The laminate of claim 8, further comprising at least one substrate laminated to a side of the film.

10. A process for manufacturing a stretch-modified elastomeric multilayer film, the process comprising:
    providing the multilayer film of claim 1;
    performing a first stretch of the multilayer film in at least one direction at a draw ratio of at least 1.9 to form a stretch-modified multilayer film; and
    substantially relaxing the stretch-modified multilayer film in the at least one direction.

11. The process of claim 10, wherein the process further comprises laminating the stretch-modified multilayer film to at least one substrate to form a laminate.

12. The process of claim 11, wherein the substrate is a nonwoven.

13. The process of claim 11, wherein the substrate is an elastic nonwoven.

14. The process of claim 13, wherein the elastic nonwoven has a corrugated shape.

15. The process of claim 11, wherein the laminate undergoes a second stretch in at least one direction to a draw ratio of 3.6 or less of its pre-second stretch length.

16. The process of claim 11, wherein the laminate does not undergo a second stretch.

* * * * *